(12) United States Patent
Kaler et al.

(10) Patent No.: US 7,743,145 B2
(45) Date of Patent: Jun. 22, 2010

(54) VERIFYING MEASURABLE ASPECTS ASSOCIATED WITH A MODULE

(75) Inventors: Christopher G. Kaler, Sammamish, WA (US); John P. Shewchuk, Redmond, WA (US); Bradford H. Lovering, Seattle, WA (US); Daniel R. Simon, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1706 days.

(21) Appl. No.: 10/827,474

(22) Filed: Apr. 19, 2004

(65) Prior Publication Data

US 2005/0246760 A1 Nov. 3, 2005

(51) Int. Cl.
*G06F 15/16* (2006.01)

(52) U.S. Cl. ............... 709/225; 709/203; 709/223; 726/4; 726/5; 726/8; 726/9; 726/17; 726/21

(58) Field of Classification Search .......... 709/203, 709/223, 225; 726/4, 5, 8, 9, 17, 21
See application file for complete search history.

(56) References Cited

U.S. PATENT DOCUMENTS

| | | | |
|---|---|---|---|
| 6,088,805 A * | 7/2000 | Davis et al. | 726/10 |
| 6,516,416 B2 * | 2/2003 | Gregg et al. | 726/8 |
| 6,542,610 B2 * | 4/2003 | Traw et al. | 380/262 |
| 6,754,829 B1 * | 6/2004 | Butt et al. | 726/8 |
| 7,367,063 B1 * | 4/2008 | O'Toole, Jr. | 726/34 |

\* cited by examiner

*Primary Examiner*—Jinsong Hu
(74) *Attorney, Agent, or Firm*—Workman Nydegger

(57) ABSTRACT

The present invention extends to validating measurable aspects of computing system. A provider causes a challenge to be issued to the requester, the challenge requesting proof that the requester is appropriately configured to access the resource. The requester accesses information that indicates how the requester is to prove an appropriate configuration for accessing the resource. The requester formulates and sends proof that one or more measurable aspects of the requester's configuration are appropriate. The provider receives proof that one or more measurable aspects of the requester's configuration are appropriate and authorizes the requester to access the resource. Proof of one more measurable aspects of a requester can be used along with other types of authentication to authorize a requester to access a resource of a provider. Solutions to challenges can be pre-computed and stored in a location accessible to a provider.

27 Claims, 8 Drawing Sheets

VERIFYING MEASURABLE ASPECTS ASSOCIATED WITH A MODULE

BACKGROUND OF THE INVENTION

1. The Field of the Invention

The present invention relates to verifying measurable aspects of a module. More specifically, the present invention relates to verifying measurable aspects of a module to determine if a module is appropriately configured, for example, to access a resource or to issue challenges to other modules.

2. Background and Related Art

Computer systems and related technology affect many aspects of society. Indeed, the computer system's ability to process information has transformed the way we live and work. Computer systems now commonly perform a host of tasks (e.g., word processing, scheduling, and database management) that prior to the advent of the computer system were performed manually. More recently, computer systems have been coupled to one another and to other electronic devices to form both wired and wireless computer networks over which the computer systems and other electronic devices can transfer electronic data. As a result, many computerized tasks (e.g., voice communication, accessing electronic mail, controlling home electronics, and Web browsing) include electronic communication between a number of computer systems and/or other electronic devices via wired and/or wireless computer networks.

Some computerized tasks require limited interaction between modules at different computer systems. For example, an electronic mail client can query an electronic mail server for a user's electronic mail messages. When electronic messages are present at the electronic mail server, the electronic mail server can return the electronic mail messages in response to the query. However, this is a simple request/response mechanism and requires little, if any, additional interaction between the electronic mail client and electronic mail server Other computerized tasks can require more tightly integrated distributed components. For example, some mechanisms require a number of modules at different networked computer systems (often referred to as "distributed components") to implement more complex interactions of a single application (often referred to as a "distributed application"). For example, a unified inventory application may require more complex communication between a number of distributed components at different branch offices to appropriately reflect the number of items in stock for a company.

Often, for example, when transferring confidential or financial data, it may be desirable for computing systems to communicate with one another in a secure manner. Accordingly, computing systems can authenticate and agree on the mechanisms used to secure the data (e.g., electronic messages) transferred between the computing systems. For example, two computing systems may use the Secure Sockets Layer ("SSL") protocol to establish a secure connection between one another. Further, it may be desirable for an application at a first computing system to prove proof of identity to another application at a second computing system (either in combination with or separately from computer system authentication). For example, a banking client may require that a corresponding server banking server prove its identity before the banking client will transfer financial data to the banking server. Proving the identity of an application can be done in accordance with Web service specifications, such as, for example, WS-Security and WS-Trust.

Unfortunately, there are typically no mechanisms for one distributed component to authenticate the actual instructions (code) that make up an application at another distributed component. That is, there typically are no mechanisms for a first distributed component to validate the bits of an application as stored on disk or in system memory of second distributed component that is in communication with the first distributed component. For example, even when a computer system and service are appropriately identified, there is no way to determine if the service will operate as intended. Thus, a user or programmer with access to authentication information for the service (a bank server) could alter the service for some malicious purpose (e.g., to intercept financial data) and yet still authenticate the service to external programs.

Unauthenticated code may be especially problematic when occurring among distributed components included in a distributed system. For example, some distributed systems may have a number of components that are specifically designed and tested for compatible operation and/or that are sold together and subject to a uniform license agreement. However, one distributed component may have no way to determine that another distributed component is in fact a licensed component and/or that another distributed component was designed and tested for compatibility. For example, an emulator, or "knock-off", can mimic protocols used by a distributed component to appear as a designed and tested distributed component. However, emulators that have not been designed and tested for compatibility may cause other components of the distributed application to malfunction, cause security vulnerabilities or breeches, or otherwise operate inappropriately. It may also be that the use of an emulator violates a licensing agreement.

There is also often no way for one distributed component to determine the execution environment (e.g., operating system, hardware components, etc.) associated with other distributed components. Distributed components may be tested and specifically configured for use is specific execution environments (e.g., protected or secure compartmentalized environments). However, since a distributed application may include many distributed components that execute at different locations (logically and/or physically) there is always some chance (e.g., due to improper installation or administration or as a result of hacking) that a distributed component is executed outside of an appropriate execution environment. A distributed component executing outside of an appropriate environment can cause other distributed components to malfunction or otherwise operate inappropriately. Accordingly, what would be advantageous are mechanisms for validating distributed components and for preventing interaction with distributed components that have not been validated.

BRIEF SUMMARY OF THE INVENTION

The foregoing problems with the prior state of the art are overcome by the principles of the present invention, which are directed towards systems, methods, and computer program products for verifying measurable aspects of a module. Embodiments of the invention can verify measurable aspects of a module to determine if the module is appropriately configured, for example, to access a resource at another module or to issue challenges to other modules.

A first module (e.g., a token service or a module that hosts a resource) provides an indication (e.g., an electronic message including a challenge or policy information) that one more measurable aspects of a second module are to be verified. The second module accesses the indication (e.g., from the electronic message or from storage) and formulates an assertion that that can be used to verify that the second module is configured in accordance with the one or more measurable aspects (e.g., that the second module has a specified configuration). Measurable aspects can include, for example, program identity and execution environment. The second module sends the formulated assertion for verification. The first module receives the assertion and verifies the assertion. As appropriate, when measurable aspects of the second module are verified, the second module is allowed to access a resource of the first module or the first module accepts subsequent challenges from the second module.

In some embodiments, the assertion is verified at a challenge service. In response to a verified assertion, the second module can receive a token from an external token service and then submit the token (a representation of proof) as proof of a configuration appropriate for accessing a resource or for issuing challenges to other modules.

In some embodiments, proof of one more measurable aspects of a requester are used along with machine identification and application identification to determine that a requester is appropriately configured to access a resource of a provider. For example, subsequent to two computing systems authenticating and/or two modules of a distributed application authenticating, a requester may provide proof of one more aspects of the requester's configuration to a provider. Similarly, in other embodiments, proof of one more measurable aspects of a provider are used along with machine identification and application identification to determine that the provider is appropriately configured to issue challenges to the requester. For example, a provider may provide proof of one more aspects of the provider's configuration to a requester.

Bi-directional challenges can also be performed. For example, a requester can challenge a provider to prove it is appropriately configured to issue challenges to the requester while the provider challenges the requester to prove it is appropriately configured to access a resource. When proof of measurable aspects is included as part of a challenge, solutions to the challenge can be pre-computed and stored in a location accessible to a requester or provider. Accordingly, when formulated proof is received from a corresponding provider or requester, the formulated proof can be more efficiently validated.

Additional features and advantages of the invention will be set forth in the description that follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

Figure 1:
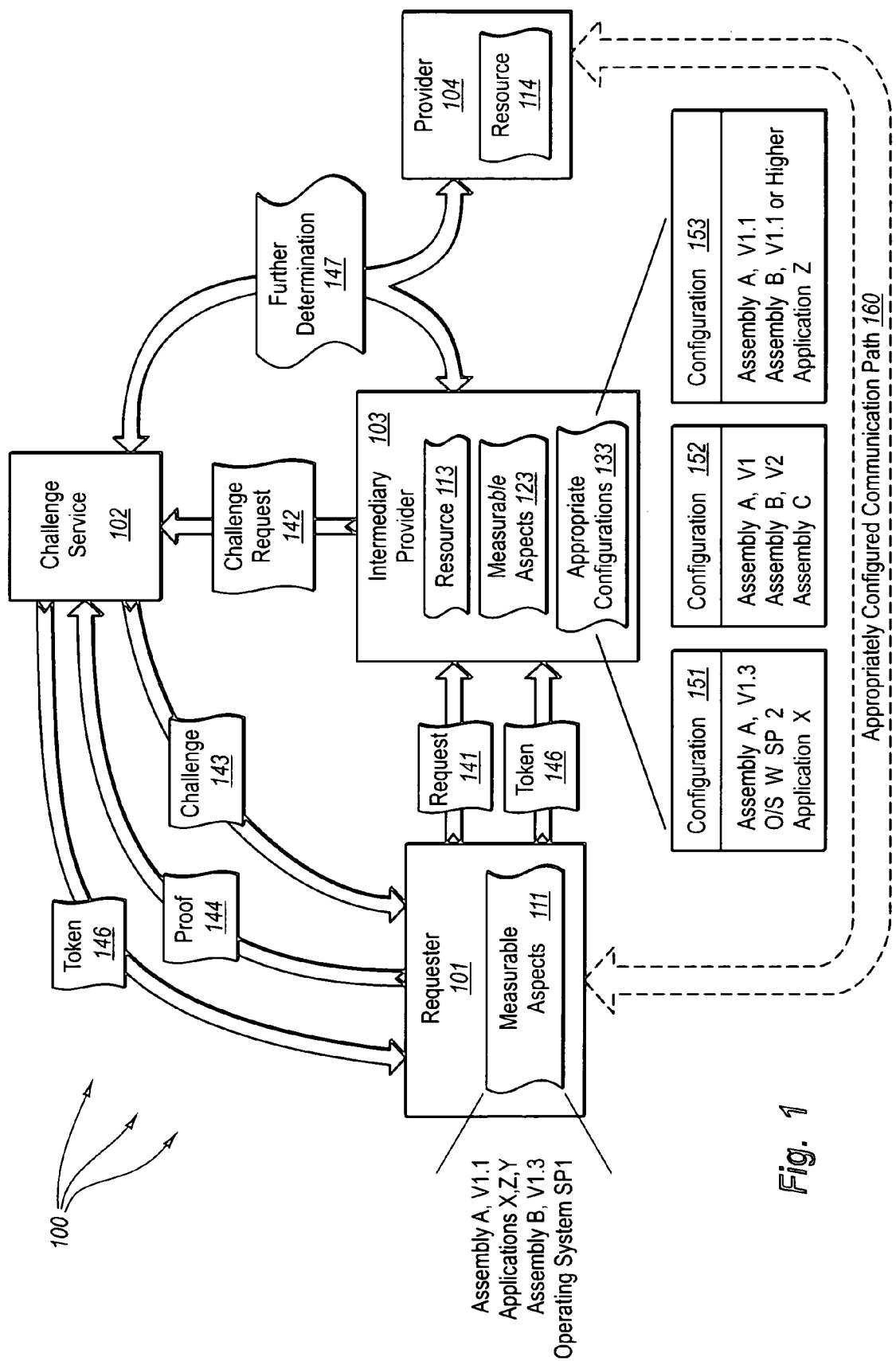
FIG. 1 illustrates an example of an architecture that facilitates determining that a requester is appropriately configured to access a resource of a provider in accordance with the principles of the present invention.

The present invention extends to methods, systems, and computer program products for verifying measurable aspects of a module. Embodiments of the present invention can verify measurable aspects of a module to determine if the module is appropriately configured, for example, to access a resource or to issue challenges to other modules.

A first module (e.g., a token service, a module that hosts a resource, or a requestor of a service) provides an indication (e.g., an electronic message including a challenge or policy information) that one more measurable aspects of a second module are to be verified. The second module accesses the indication (e.g., from the electronic message or from storage) and formulates an assertion that can be used to verify that the second module is configured in accordance with the one or more measurable aspects (e.g., that the second module has a specified configuration). Measurable aspects can include, for example, program identity and execution environment. The second module sends the formulated assertion for verification. The first module receives the assertion and verifies the assertion. As appropriate, when measurable aspects of the second module are verified, the second module is allowed to access a resource of the first module or the first module accepts subsequent challenges from the second module.

In some embodiments, proof of one more measurable aspects of a requester are used along with machine authentication and application authentication to determine that a requester is appropriately configured to access a resource of a provider or that a provider is appropriately configured to issue challenges to a requester. For example, subsequent to two computing system authentication and/or two components of a distributed application authenticating, a requester may provide proof of one more aspects of the requester's configuration to a provider. Similarly, a provider may provider proof of one or more aspects of the provider's configuration to a requester. Solutions to challenges can be pre-computed and stored in a location accessible to a provider. Accordingly, when formulated proof is received from a requester, the formulated proof can be more efficiently verified.

The embodiments of the present invention may comprise a special purpose or general-purpose computer including various computer hardware and software, as discussed in greater detail below. In particular, embodiments within the scope of the present invention include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other physical storage media, such as optical disk storage, magnetic disk storage or other magnetic storage devices, or any other medium which can be used to carry or store desired program code means in the form of computer-executable instructions or data structures and which can be accessed by a general purpose or special purpose computer.

When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media. Computer-executable instructions comprise, for example, instructions and data which cause a general purpose computer, special purpose computer, or special purpose processing device, such as a GPU, to perform a certain function or group of functions.

In this description and in the following claims, a "computing system" is defined as one or more software modules, one or more hardware modules, one or more firmware modules, or combinations thereof, that work together to perform operations on electronic data. For example, the definition of computer system includes the hardware components of a personal computer, as well as software modules, such as the operating system of the personal computer. The physical layout of the modules is not important. A computer system may include one or more computers coupled via a network. Likewise, a computer system may include a single physical device (such as a mobile phone or Personal Digital Assistant "PDA") where internal modules (such as a memory and processor) work together to perform operations on electronic data. A computing system can include electrical as well as biological components and modules.

Those skilled in the art will appreciate that the invention may be practiced with many types of computer system configurations, including, personal computers, laptop computers, multi-processor systems, minicomputers, mainframe computers, peripheral devices, biological computing devices, and the like. Peripheral devices include, for example, printers, fax machines, scanners, mice, microphones, home electronic devices, network gateways, or other devices that can utilized by a computer system to perform a specified action. The invention may also be practiced in distributed system environments where local and remote computer systems, which are linked (either by hardwired links, wireless links, or by a combination of hardwired and wireless links) through a network, both perform tasks. In a distributed system environment, program modules and associated data structures may be located in both local and remote memory storage devices.

Generally, one module can provide another module with an indication of one or measurable characteristics of the other module that are to be verified. For example, one module can request verification of measurable aspects of another module to cause the other module to prove it is appropriately configured to access a resource or to prove it is appropriately configured to issue challenges to other modules. It should be understood that any description of verifying measurable aspects to prove an appropriate configuration for accessing a resource also applies to verifying measurable aspects to prove an appropriate configuration for issuing challenges and vice-versa.

In this description and in the following claims, a "requester" is an entity that requests access to a resource. In this description and in the following claims, a "provider" is an entity that controls access to a resource. Thus, it may be that a requester requests access to a resource that is controlled by a provider. It should be understood that any module or component can be both a provider and requester. That is, a module or component may request access to some resources while controlling access to other resources.

In this description and in the following claims, a "resource" is defined generally to include any object that can be processed at a computing system. A resource can be a portion of executable instructions or data. For example, a requesting portion of a banking application can request access to executable instructions of a providing portion of the banking application. Similarly, the requesting portion of the banking application can request access to data controlled by the providing portion of the banking application. In some embodiments, a resource can be an indication that one module is appropriately configured to challenge another module.

FIG. 1 illustrates an example of an architecture 100 that facilitates determining that a requester is appropriately configured for accessing a resource of a provider in accordance with the principles of the present invention. Within architecture 100, requester 101, intermediary provider 102, provider 104, and challenge service 102 can interoperate to implement the principles of the present invention. Requester 101, intermediary provider 102, provider 104, and challenge service 102 can exchange electronic messages in any of a variety of protocols, such as, for example, Simple Object Access Protocol ("SOAP").

Provider 103 includes resource 113 and appropriate configurations 133. Each configuration in configurations 133 (e.g., configurations 151, 152, and 153) is a configuration that is to be present at a requester for the requester to access resource 113. An appropriate configuration can include identity values (e.g., byte values of the program stored on disk, version numbers, environment variables, etc.) for one or more measurable aspects of a module, such as, for example, values associated with executable-instructions, SEE applications and assemblies. An appropriate configuration can also include execution environment values, such as, for example, hardware components values, platform components values, operating systems values, execution environments, indications of protected execution, indications of compartmentalized execution, indications of other types of execution, call stack values, data stream values, communication port settings, etc. Appropriate configurations can be varied by changing values (for measurable aspects) that are to be proved by a requester. For example, when a newer version of an assembly is created, a provider may require a requester to prove that the requester has access to the bytes (e.g., in memory or stored on disk) comprising the newer version of the assembly.

In some embodiments, digests are used to represent appropriate configurations. To generate a representative digest, values of one or more measurable aspects can be provided as input to a hash algorithm, the output of which is a digest representing the values. For example, values for each of the items in configuration 151 can be provided to a hash algorithm to generate a single digest representative of configuration 151. Altering the processing order of values can result in different digests. For example, a digest indicating proof of Assembly A version 1.1 and then proof of Application X may be different than a digest indicating proof of Application X and then proof of Assembly A version 1.1. Thus, a provider can essentially have multiple configurations for the same measurable aspects by changing the order in which the measurable aspects are processed.

As requirements for accessing resource 113 change, intermediary provider 103 can add and remove appropriate configurations from appropriate configurations 133. For example, from time to time, intermediary provider 103 can generate a new digest from the same measurable aspect values so as to deter malicious users and/or programs from forging proof of an appropriate configuration. A provider can limit support to the more recent configurations (digests). This can result in a chase environment at application-specific rates, as new configurations are made available, older ones are no longer used. Thus, cracking an older configuration has limited value, the cost of cracking must be less than the renewal/discard rate to be of any value, and that cracking is an on-going investment. Accordingly, configurations can be utilized as a renewable security mechanism.

Requester 101 includes measurable aspects 111. Measurable aspects 111 represent a wide variety of measurable aspects, such as, for example, measurable aspects associated with SEE applications, assemblies, hardware components, platform components, operating systems, protected or compartmentalized execution environments, call stacks, data streams, etc., for which values can be determined. For example, as depicted, measurable aspects 111 includes Assembly A version 1.1, Applications X, Y, and Z, Assembly B version 1.3, and Operating System service pack 1. Measurable aspects 111 can also include a number of other measurable aspects that are not expressly depicted. Requester 101 can measure values for any of measurable aspects 111, such as, for example, version numbers, bytes value from disk or memory, when formulating proof. When measuring byte values from disk or memory, requester 101 can measure byte values from one or more code regions (e.g., one or more different disk and/or memory locations) at requester 101.

Values of one or more measurable aspects representing a configuration can be included in a manifest. For example, values for one or more aspects of measurable aspects 111 can be included in a manifest, such as, for example, a list of measurable aspects. The manifest is then representative of a configuration of requester 101 and provides proof that requester 101 has access to and/or is configured in accordance with the one or more measurable aspects (e.g., to the bytes comprising an assembly) included in the manifest. In some embodiments, a manifest is identified from a representation of values for one or more measurable aspects (e.g., a digest). For example, based on the digest value "14532", an association module can determine that there is an increased likelihood of a manifest listing Assembly A V1.1, Assembly B V1.3, and Operating System SP1 being used.

It may be that a manifest is a unique signature (e.g., an encrypted digest) representing a particular configuration of requester 101. For example, a list of one or more measurable aspects (or simply the digest used to identify the measurable aspects) can be fed into a processor to obtain a unique signature representing a particular configuration. From time to time, requester 101 can download configurations (and other policy information) that are appropriate for accessing a resource. For example, requester 101 can download one or more configurations from appropriate configurations 133 (e.g., configurations 151, 152, and 153) that are appropriate for accessing resource 113 (and/or resource 114).

Digests can be signed and validated using an appropriate key or appropriate keys. In some embodiments, digests are signed and validated using a single shared key. For example, when requester 101 and intermediary provider 103 utilize the same operating system, a shared key corresponding to the operating system can be used to sign and validate digests. In other embodiments, digests are signed and validated using one of a plurality of shared keys. For example, when requester 101 and intermediary provider 103 utilize the same regional version of the operating system (e.g., a North American version or European version), a shared key corresponding to the same regional version of the operating system can be used to sign and validate signatures.

In yet other embodiments, digests are signed using a private key and validated using corresponding group public key. The group public key can be used to validate digests created from the private key as well as one or more other private keys from a group of keys that includes the private key. For example, requester 101 can use a private key from a group of private keys to sign a digest and intermediary provider 103 can use a corresponding group public key to validate the digest, wherein the public key can also be used to validate digests created with other private keys in the group of public keys. In yet further embodiments, digests are signed using a private key and validated using corresponding public key, wherein the public key can only be used to validate digests signed with the private key. For example, requester 101 can use a private key to sign a digest and intermediary provider 103 can use a corresponding public key to validate the digest.

In yet even further embodiments, a communication channel key (e.g., a key used to establish an SSL connection) is used to sign a digest. In yet even further other embodiments, a hardware-based key is used to sign a digest.

Challenge service 102 can be a service that issues challenges to modules and components that request access to resources of intermediary provider 103 (and/or provider 104). For example, in response to a request from requester 101, intermediary provider 103 can cause challenge service 102 to issue a challenge to requester 101. Challenge server 102 can be included along with intermediary provider 103 in the same computing system or can be external to intermediary provider 103. Challenge service 102 may be a security token service that issues security tokens used for accessing resources.

In some embodiments, a first module requests an indication that a second module is appropriately configured to challenge configurations of the first module before the first module accepts challenges from the second module. For example, before requester 101 accepts challenges from challenge service 102, requester 101 can issue a configuration challenge to intermediary provider 103 to cause intermediary provider 103 to prove it is appropriately configured to issue challenges to requester 101. For example, requester 101 may require an established Secure Sockets Layer ("SSL") connection before accepting configuration challenges from intermediary provider 103.

It may also be that intermediary provider 103 has previously received security policies indicating other modules that are appropriately configured to challenge requester 101 and/or other modules that are not appropriately configured to challenge requester 101. When intermediary provider 103 is appropriately configured, requester 101 may accept challenges issued from (or caused to be issued by) intermediary provider 103. On the other hand, when intermediary provider 103 is not appropriately configured, requester 101 may ignore or refuse challenges issued from (or caused to be issued by) intermediary provider 103.

Figure 2:
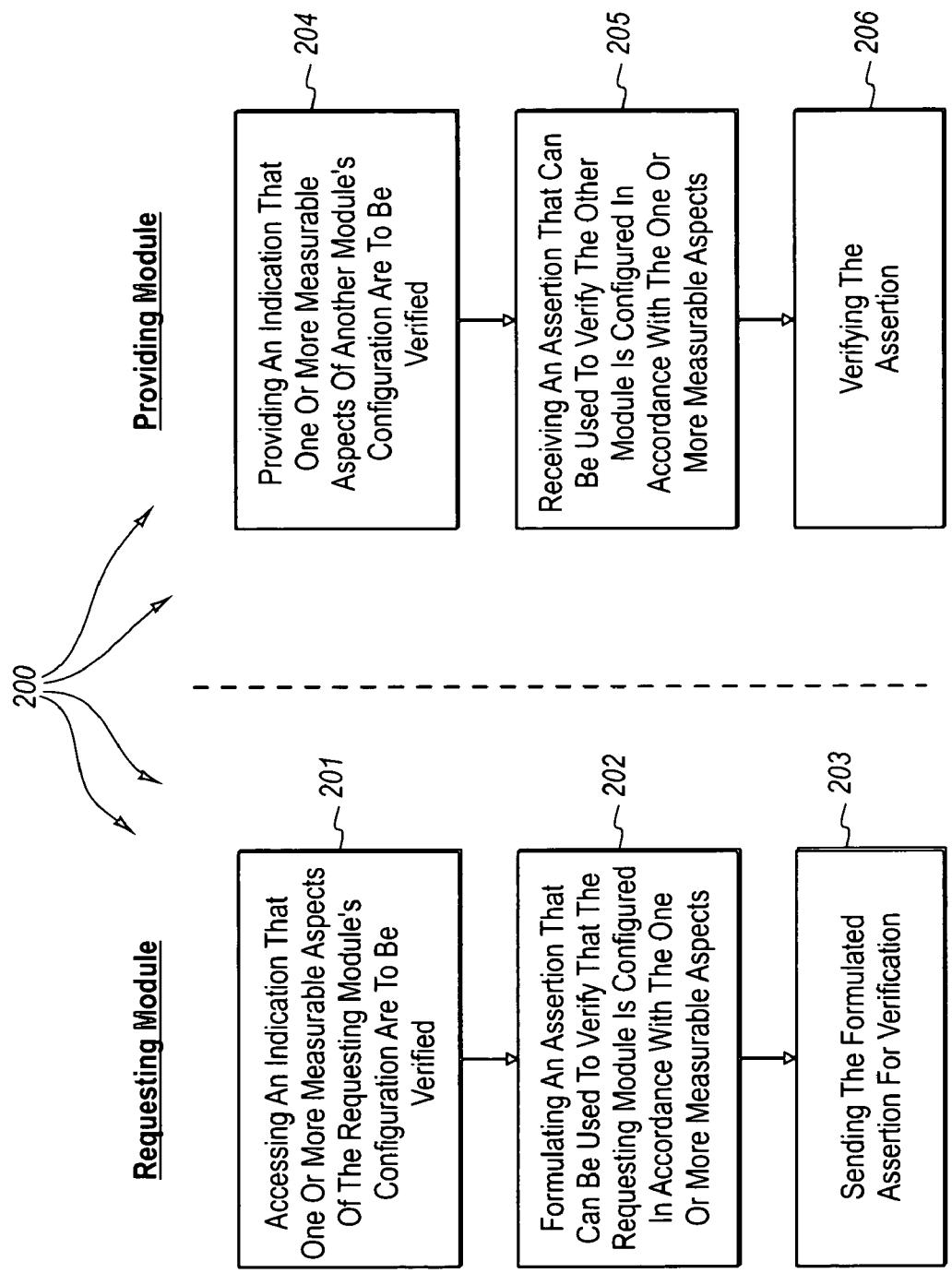
FIG. 2 illustrates an example flowchart of a method for determining that a requester is appropriately configured to access a resource of a provider in accordance with the principles of the present invention.

FIG. 2 illustrates an example flowchart of a method for verifying one more measurable aspects of a module in accordance with the principles of the present invention. The method 200 can be performed to verify that a module is appropriately configured for accessing a resource or issuing challenges to other modules. The method 200 will be described with respect to the modules and data in architecture 100.). The method 200 includes an act of providing an indication that one or more measurable aspects of another module's configuration are to be verified. For example, intermediary provider 103 can cause challenge 143 to be issued to requester 101. As depicted in architecture 100, in response to request 141, intermediary provider 103 sends challenge request 142 to challenge service 102. Challenge service 102 responds by issuing challenge 143. Challenge 143 can be a challenge to requester 101 to prove that requester 101 is appropriately configured to access resource 103. Alternately, intermediary provider 103 can issue a challenge directly to requester 101 or can send policy information to requester 101.

The method 200 includes an act of accessing an indication that the one or more measurable aspects of the requesting module's configuration are to be verified (act 201). For example, requester 101 can access information that indicates how the requester is to prove that requester 101 is appropriately configured to access resource 113. In some embodiments, a requester receives a challenge including information that indicates how the requester is to prove that the requester is appropriately configured to access a resource. For example, challenge 143 can include information that indicates how requester 101 is to prove that requester 101 is appropriately configured to access resource 113.

In other embodiments, a requester accesses previously received policy information that indicates how the requester is to prove that the requester is appropriately configured to access a resource. Requester 101 can previously have received policy information indicating how to prove requester 101 is appropriately configured to access resource 113. Requester 101 can access the previously received policy information when requesting access to resource 113. It some embodiments, a request is for the identity of one or more portions of executable instructions and/or an execution environment at the requester The method 200 includes an act of formulating an assertion that can be used to verify that the requesting module is configured in accordance with the one more measurable aspects (act 202). For example, requester 101 can formulate proof 144 that represents one or more measurable aspects of requester 101's configuration are appropriate for accessing resource 113. Proof 144 can be a manifest (e.g., a signed digest or list of measurable aspects), based on measurable aspects 111. For example, proof 144 can be a manifest representing configuration 153 (an appropriate configuration for accessing resource 113).

The method 200 includes an act of sending the formulated assertion for verification (act 203). For example, requester 101 can send proof 144 to challenge service 102. In response to proof 144, challenge service 102 can return token 146 to requester 101. Requester 101 can then send token 146 to intermediary provider 103. Alternately, and when appropriate, requester 101 can send proof (e.g., proof 144) directly to intermediary provider 103.

The method 200 includes an act of receiving an assertion that can be used to verify that the other module is configured in accordance with the one or more measurable aspects (act 205). For example, intermediary provider 133 can receive token 146 indicating that requester 101 is configured in accordance with configuration 153. Alternately, and when appropriate, intermediary provider 103 can receive proof (e.g., proof 144) directly from requester 101 provider 103.

When a provider receives proof of an appropriate configuration, the provider has some assurance that the requester is configured to access the resource without adversely affecting the resource and/or the provider. Thus, proof of an appropriate configuration can indicate that the requester complies with one or more policies of the provider. Proof of an appropriate configuration can also be used to certify that a deployed module is appropriate for accessing a resource.

Proof of an appropriate configuration can also indicate that the requester is not a malicious program (e.g., a virus) and that the requester is not attempting to gain unauthorized access to the resource. On the other hand, failure to provide proof of an appropriate configuration can indicate that the requester does not comply with one or more polices of the provider. Repeated requests for access to a resource without providing proof of an appropriate configuration may indicate that the requester is a malicious program and/or the requester is attempting to gain unauthorized access to the resource.

The method 200 includes an act of verifying the assertion (act 206). For example, intermediary provider 103 can verify token 146 or proof 144. When an assertion is verified (e.g., indicating that requester 101's configuration is appropriate), intermediary provider 113 can authorize requester 101 to access resource 113.

It may be that requester 101 has requested access to resource 114 and that resource 113 is a portion of a communication path between requester 101 and provider 104. Thus, intermediary provider 103 can request access to resource 114 (and thus functions as a requester) to establish the communication path between requester 101 and provider 104. Accordingly, further determination 107 can be performed between intermediary provider 103, provider 104, and token service 102, to determine that intermediary provide 103 (and potentially also requester 101) is appropriately configured to access resource 114. Further determination 107 can be performed between intermediary provider 103, provider 104, and token service 102 in a manner similar to determining that requester 101 is appropriately configured to access resource 113.

That is, provider 104 can indicate one or more configurations that are appropriate for accessing resource 114. Intermediary provider 103 can provide proof, based on measurable aspects 132, that intermediary provider 103 includes at least one of the appropriate configurations. When appropriate, appropriately configured communication path 160 is established between requester 101 and provider 104 and requester 101 is authorized to access resource 114.

Although architecture 100 depicts a provider challenging a requester, it would be apparent to one skilled in the art that architecture 100 can also facilitate a requester challenging a provider. Accordingly, it may be that a requester challenges a provider to provider verifiable proof that the provider is appropriately configured to issue challenges to the requester. For example, requester 101 can challenge intermediary provider 103 (and/or provider 104) to provider verifiable proof that intermediary provider 103 (and/or provider 104) is appropriately configured to issue challenges to requester 101.

In these embodiments, a requesting module (e.g., requester 101) provides an indication that one or more measurable aspects of another module's configuration (e.g., intermediary provider 103) are to be verified. A providing module (e.g., intermediary provider 103) accesses an indication that one or more measurable aspects of the provider module's configuration are to be verified. The providing module formulates an assertion that can be used to verify that the providing module is configured in accordance with one or more measurable aspects. The providing module sends the formulated assertion for verification. The requesting module receives an assertion that can be used to verify that the other module is configured in accordance with the one or more measurable aspects. The requesting module verifies the assertion. When the assertion is verified, the requester accepts subsequent challenges from the provider.

In some embodiments, challenges occur bi-directionally. That is, a first module can both request access to a resource of and challenge a second module and the second module can both request access to a resource of and challenge the first module. The sequence of communication between the first and second modules can vary. For example, 8A depicts a first example of an architecture 800 for performing a bi-directional challenge. Depicted in architecture 800 are modules 801 and 802. Module 801 sends request/challenge 803 to module 802. Request/challenge 803 can include a request to access a resource of module 802 as well as a configuration challenge for module 802.

In response to request/challenge 803, module 802 can send challenge/response 804 to module 801. Challenge/proof 804 an include proof of a configuration (e.g., a manifest representing a configuration) that is appropriate for interacting with module 801 as well as a configuration challenge for module 801. In response to challenge/proof 804, module 801 can send proof 806 to module 802. Proof 806 can include proof of a configuration (e.g., a manifest representing a configuration) that is appropriate for accessing the resource of 802. In response to proof 806, module 802 can send issuance 807. Issuance 807 can include the requested resource or an indication that module 801 is appropriately configured to access the requested resource. Communication between modules in architecture 800 can be performed similarly to the communication between modules in architecture 100.

Figure 8B:
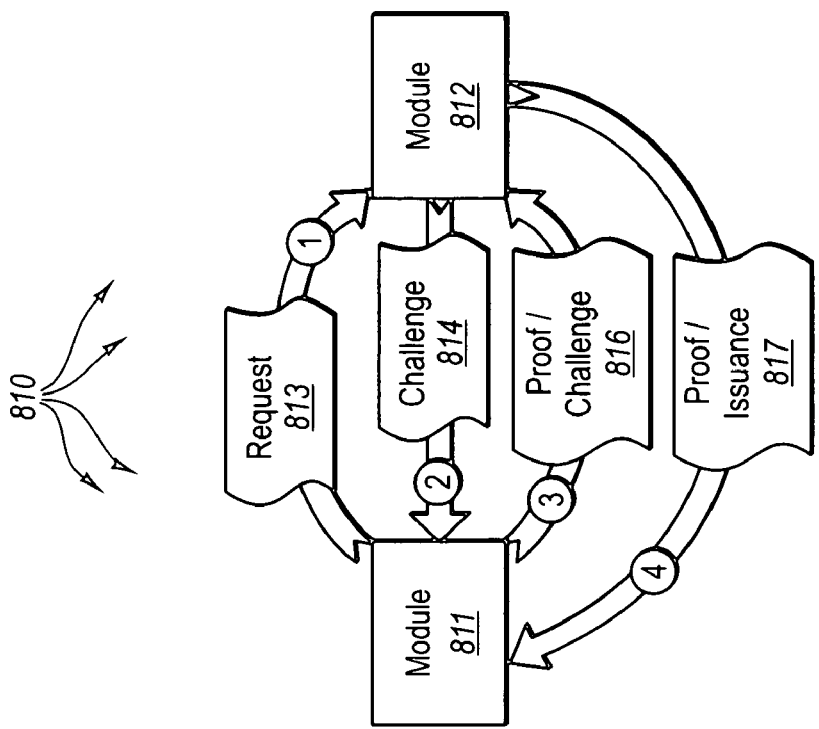
FIG. 8B illustrates a second example architecture for performing a bi-directional challenge.

FIG. 8B depicts a second example of an architecture 810 for performing a bi-directional challenge. Depicted in architecture 800 are modules 811 and 812. Module 811 sends request/challenge 813 to module 812. Request 813 can include a request to access a resource of module. In response to request 813, module 812 can send challenge 814 to module 811. Challenge 814 can include a configuration challenge for module 811. In response to challenge 804, module 811 can send proof/challenge 816 to module 812. Proof/challenge 816 can include proof of a configuration (e.g., a manifest representing a configuration) that is appropriate for accessing the resource of 812 along with a configuration challenge for module 812.

Figure 8A:
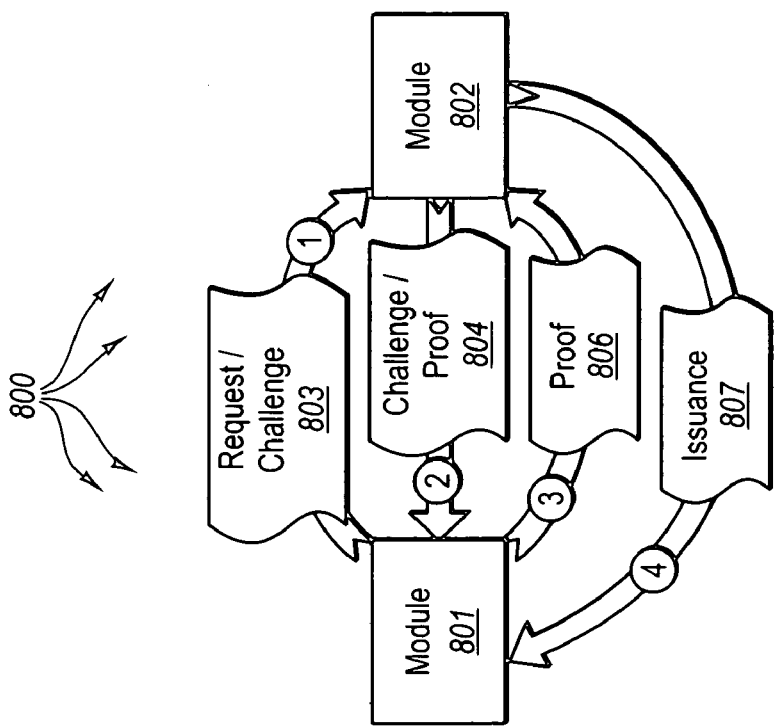
FIG. 8A illustrates a first example architecture for performing a bi-directional challenge.

In response to proof/challenge 816, module 812 can send proof/issuance 817. Proof/issuance 817 can include poof of a configuration (e.g., a manifest representing a configuration) that is appropriate for interacting with module 811 as well as the requested resource or an indication that module 801 is appropriately configured to access the requested resource. Communication between modules in architecture 810 can be performed similarly to the communication between modules in architecture 100. Other sequences of communication, in addition to those in FIGS. 8A and 8B, can also facilitate authorizing a requester to access a resource.

Figure 3:
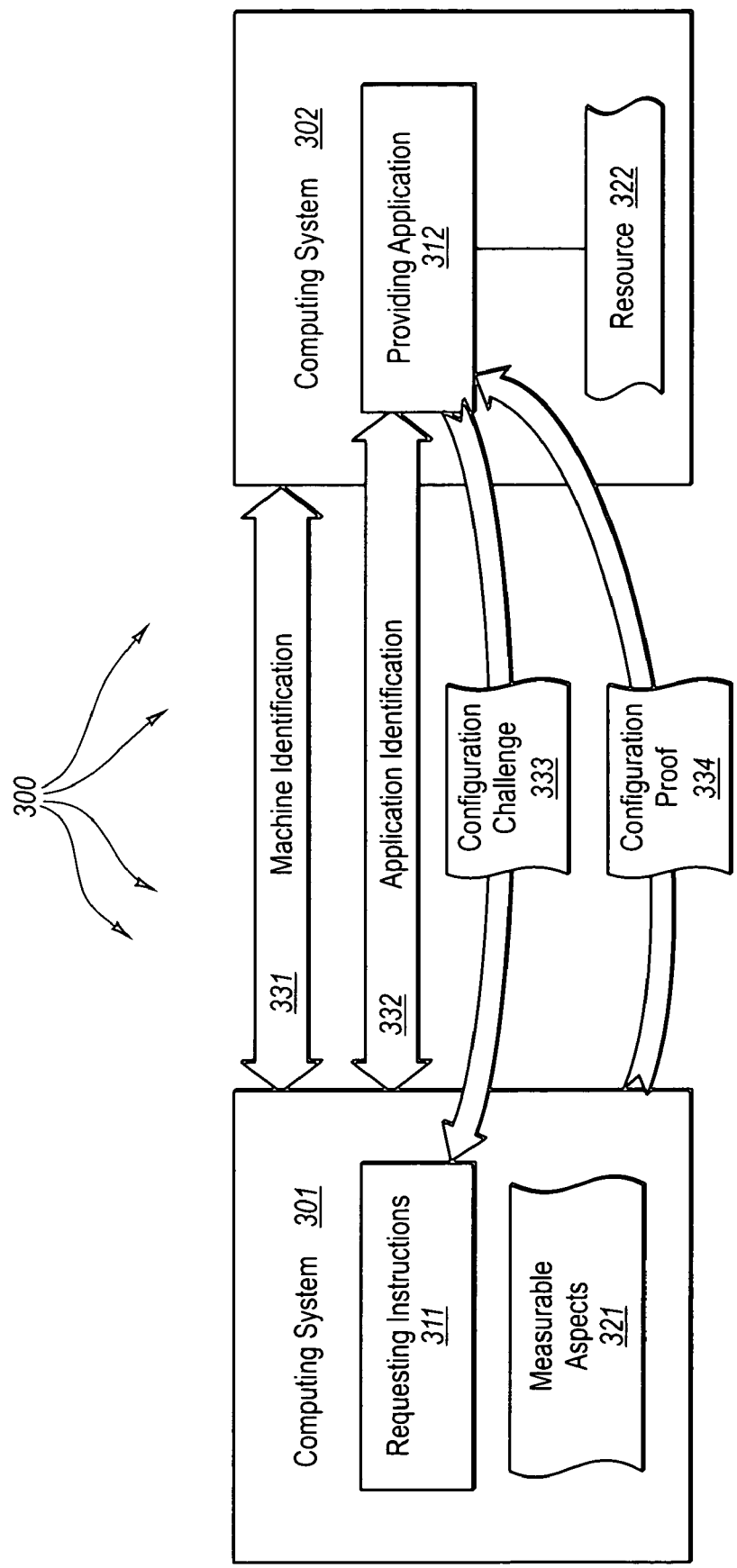
FIG. 3 illustrates an example of an architecture that facilitates utilizing machine and/or application authentication along with a code challenge to determine that a requester is appropriately configured to access a resource of a provider in accordance with the principles of the present invention.

In some embodiments, a configuration challenge occurs along with machine and/or application authentication. FIG. 3 illustrates an example of an architecture 300 that facilitates utilizing machine and/or application authentication along with a configuration challenge to determine that a requester is appropriately configured to access a resource of a provider. Within architecture 300, computing system 301 includes requesting instructions 311 (a requester) and measurable aspects 321. Measurable aspects 321 generally represent measurable aspects of computing system 321, such as, for example, identity values and execution environment values associated with requesting instructions 311. Computing (system 302 includes providing application 312 and resource 322. Computer system 301 and 302 can communicate to facilitate requesting instructions 311's access to resource 322.

Figure 4:
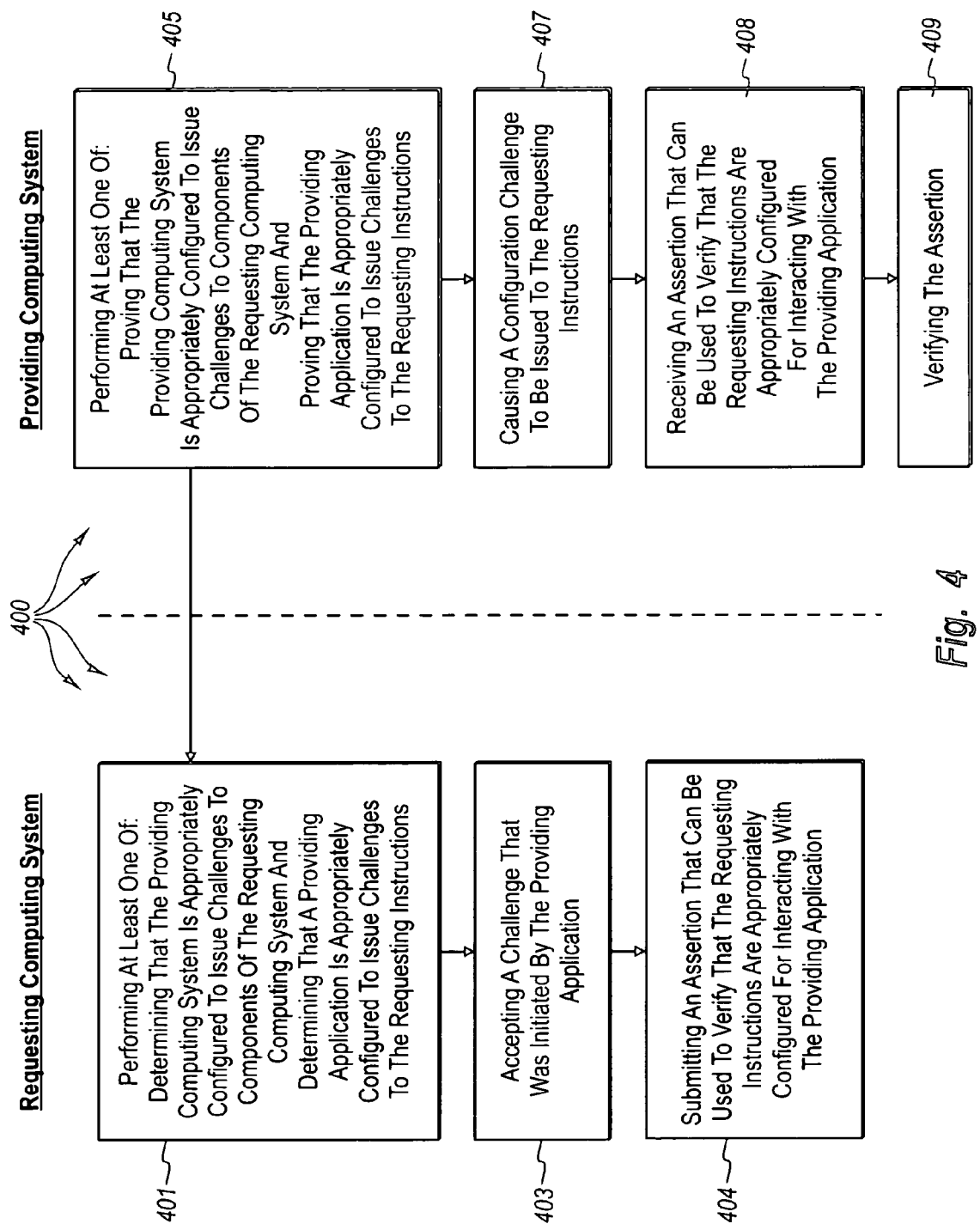
FIG. 4 illustrates an example flowchart of a method for utilizing machine and/or application authentication along with a code challenge to determine that a requester is appropriately configured to access a resource of a provider in accordance with the principles of the present invention.

FIG. 4 illustrates an example flowchart of a method 400 for utilizing machine and/or application authentication along with a code challenge determine that a requester is appropriately configured to access a resource of a provider in accordance with the principles of the present invention. The method 400 will be discussed with respect to the modules and data in architecture 300. The method 400 includes an act of performing at least one of proving that the providing computing system is appropriately configured to issue challenges to components of the requesting computing system and proving that a providing application is appropriately configured to issue challenges to the requesting instructions (act 405). The method 400 includes an act of performing at least one of, determining that the providing computing system is appropriately configured to issue challenges to components of the requesting computing system and determining that a providing application is appropriately configured to issue challenges to the requesting instructions (act 401).

For example, computing system 301 (a requesting computing system) and computing system 302 (a providing computing system) can conduct machine identification 331. Machine identification 331 can include establishing an SSL connection between computing system 301 and computing system 302. Either alternately from or in combination with computing system authorization, computing system 301 (the requesting computing system) and providing application 312 can conduct application identification 332. Application identification 332 can include providing application 312 sending proof that providing application 312 complies with one or more security and/or trust polices of the computing system 301. Computing system 301 can receive proof that providing application 312 complies with one or more security and/or trust polices of the computing system 301. Proof of compliance with security and trust polices can be transferred according to Web services specifications, such as, for example, WS-Trust and WS-Security.

The method 400 includes an act of causing a configuration challenge to be issued to the requesting instructions (act 407). For example, providing application 312 can cause configuration challenge 333 to be issued to requesting instructions 311. It may be that providing application 312 issues a configuration challenge directly to requesting instructions 311. Alternately, providing application 312 can cause a challenge service (e.g., a token service) to issue a challenge to requesting instructions 311.

The method 400 includes an act of accepting a challenge that was initiated by the providing application (act 403). For example, requesting instructions 311 can accept configuration challenge 333 from providing application 312. Alternately, requesting instructions 311 can accept a configuration challenge from a challenge service. Requesting code 311 can use machine identification 331 and/or application identification 332 as evidence that providing application 312 is aphorized to challenge requesting code 311.

The method 400 includes an act of submitting an assertion that can be used to verify that the requesting instructions are appropriately configured for interacting with the providing application (act 404). For example, computing system 301 can submit configuration proof 334 to providing application 312. Configuration proof 334 can be representative of the values of one or more measurable aspects of computing system 301. Values for measurable aspects similar to those described with respect to FIG. 1 can be submitted as proof. For example, configuration proof 334 can include a signed digest created from values of the measurable aspects (e.g., bytes of an assemblies, a version number of a hardware module, etc.) of computing system 301. When appropriate, configuration proof 334 can alternately be submitted to a challenge service. The challenge service can return a token that is subsequently sent to providing application 312.

The method 400 includes an act of receiving an assertion that can be used to verify that that the requesting instructions are appropriately configured for interacting with the providing application (act 408). For example, providing application 312 can receive configuration proof 334 indicating that requesting instructions 311 are appropriately configured for accessing resource 322. Configuration proof 334 can include a signed digest or a token. In response to configuration proof 334, providing application 312 can return resource 322 to requesting instructions 311 and/or indicate that requesting instructions are appropriately configured to access resource 322.

The method 400 includes an act of verifying the assertion (act 409). For example, computing system 302 can verify configuration proof 334 or can forward proof 334 to another module (e.g., a token service) that can verify configuration proof 334. When proof 334 is verified to indicate that requesting instructions 311 are appropriately configured, requesting instructions 311 can be allowed to interact with providing application 312.

Figure 5:
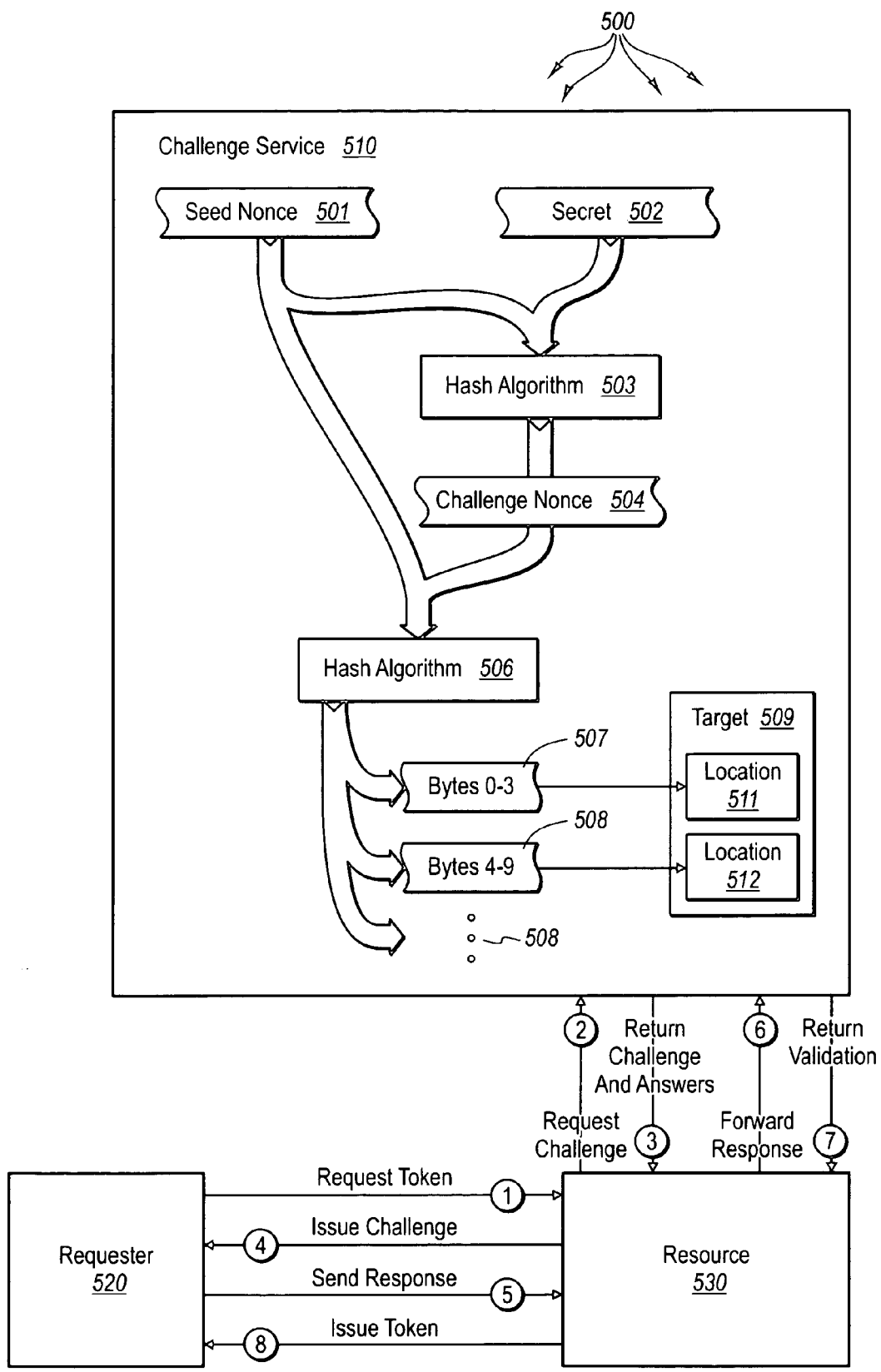
FIG. 5 illustrates an example architecture that can be used to pre-compute the answer to a challenge in accordance with the principles of the present invention
Figure 6:
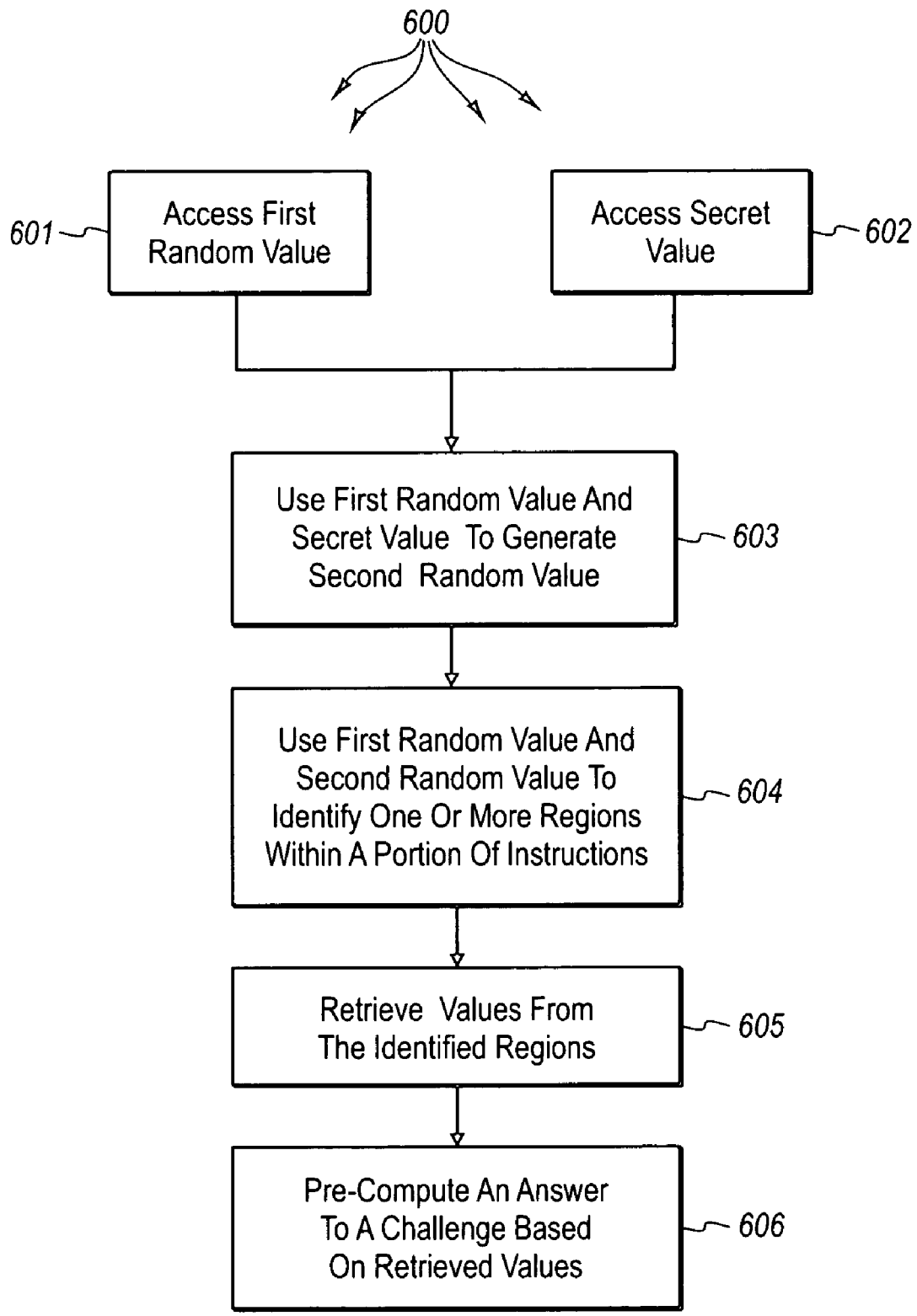
FIG. 6 illustrates an example flowchart of a method for pre-computing an answer to a challenge in accordance with the principles of the present invention.

FIG. 5 illustrates an example architecture 500 that can be used to pre-compute the answer to a challenge in accordance with the principles of the present invention. Within architecture 500 requester 520 can request a token from resource 530. In response to the token request, resource 530 can request a challenge from challenge service 510. FIG. 6 illustrates an example flowchart of a method 600 or pre-computing an answer to a challenge in accordance with the principles of the present invention.

The method 600 includes an act of accessing a first random value (act 601). For example, challenge service 510 can access seed nonce 501. The method 600 includes an act of accessing a secret value (act 602). For example, challenge service 510 can access secret 502. The method 600 includes an act of using the first random value and secret to generate a second random value (act 603). For example, hash algorithm 503 can used seed nonce 501 and secret 502 to generate challenge nonce 504. Hash algorithm 503 can may any of a wide variety of hash algorithms including the SHA1 algorithm.

The method 600 includes an act of using the first random value and the second random value to identify one or more regions within a portion of instructions (act 604). For example, hash algorithm 506 can use seed nonce 501 and challenge nonce 504 to identify regions 507 and 508. Hash algorithm 506 can may any of a wide variety of hash algorithms including the P_SHA1 algorithm. Target 509 can include instructions for appropriately accessing resource 530. Target 509 can be, for example, an assembly, stored on computer-readable media, such as, for example, system memory or magnetic disk, that is accessible to challenge service 510.

Region 507 can indicate that bytes 0 through 3 of a pre-computed answer are to be retrieved from location 511. Similarly, region 508 can indicate that bytes 4 through 9 of the pre-computed answer are to be retrieved from location 512. Vertical ellipsis 514 indicates that other regions can refer to other locations in target 509 or to locations in other targets. Different embodiments can utilize regions of different sizes.

The method 600 includes an act of retrieving values from the identified regions (act 605). For example, challenge service 510 can retrieve the values of bytes stored at locations 511 and 512 (as well as other identified regions). The method 600 includes an act of pre-computing an answer to a challenge based on the retrieved values (act 606). For example, challenge service 510 can concatenate bytes from a plurality of different locations within target 509 to pre-compute an answer to a challenge requesting proof of access to target 509.

Challenge service 510 can return the challenge and one or more answers to resource 530. For example, challenge service 510 can return a challenge to prove access to target 509 along with an answer including values of bytes retrieved from locations 511 and 512. Resource 530 can issue the challenge to requester 520. For example, resource 530 can challenge requester 520 to retrieve byte values from regions 507 and 508 within target 509. When requester 520 has access to target 509 (even if stored in a different location), requester 520 can retrieve the same byte values that were retrieved from locations 511 and 512.

Requester 520 can send a response to resource 530. The response can be a concatenation of byte values retrieved from regions 507 and 508. Resource 530 can compare the response to answers received from token service 520. When the response indicates a correct answer, requester 520 can be given a token for accessing resource 530. On the other hand, the response does not indicate a correct answer, requester 520 can be prevented from accessing resource 530.

Alternately, resource 530 can forward the response to challenge service 510. Challenge service 510 can attempt to verify the response, for example, by comparing the response to answers for other versions of target 109. For example, an assembly may have a plurality of different versions. Some of the versions may be more recent versions with a wider installation base. However, even older versions of the assembly may be appropriate for accessing resource 530. Yet, since these older versions do not have widespread use challenge service may not pre-compute an answer for these older versions. Thus, when receiving a response that is not an answer, resource 530 can forward the response so that these older versions can be checked. If, upon validation, the response indicates a correct answer, requester 520 can be given a token for accessing resource 530 (even when the response was not a pre-computed answer).

Figure 7:
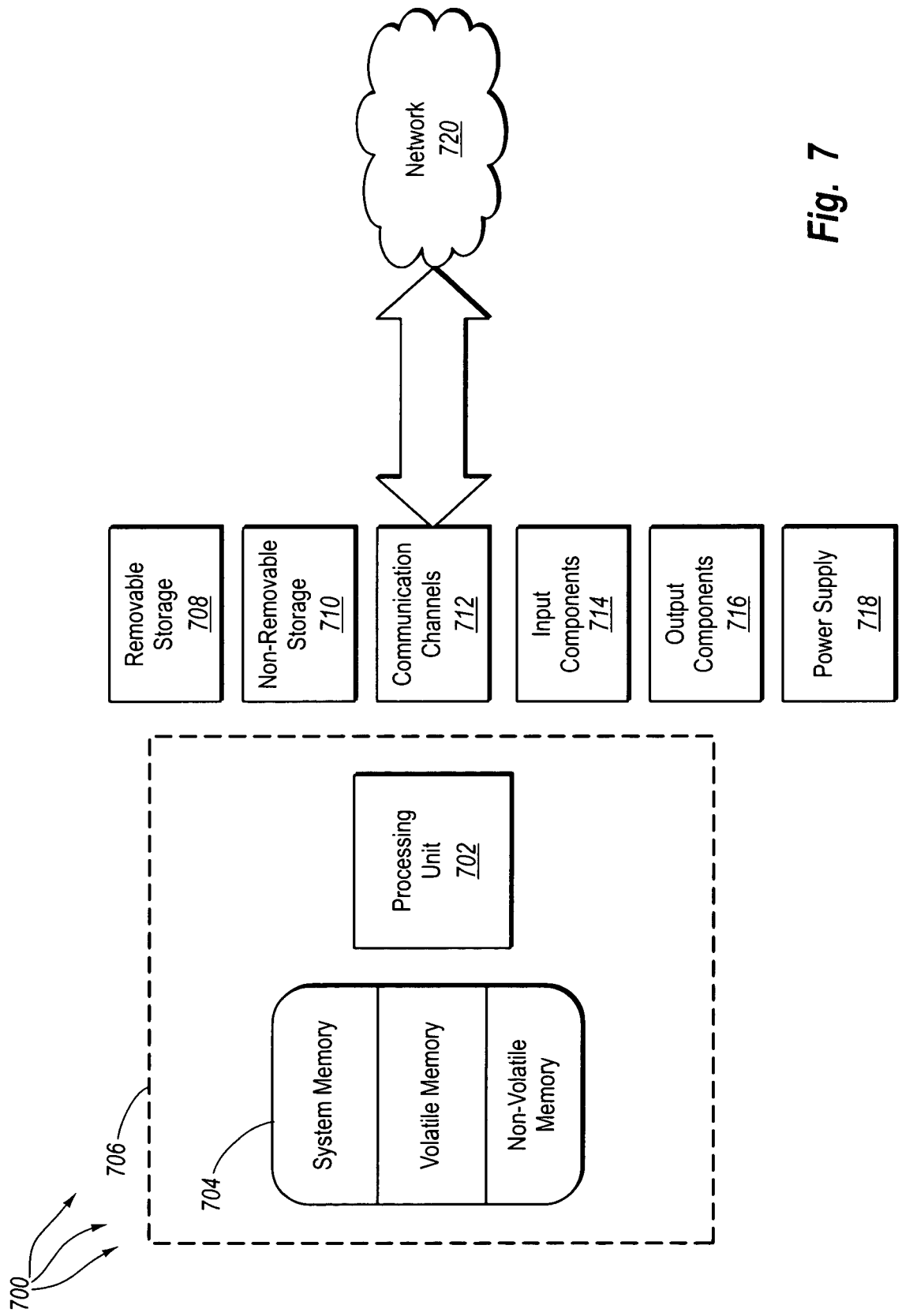
FIG. 7 illustrates a suitable operating environment for the principles of the present invention.

FIG. 7 illustrates a suitable operating environment for the principles of the present invention. In its most basic configuration, a computing system 700 typically includes at least one processing unit 702 and memory 704. The memory 704 may be volatile (such as RAM), non-volatile (such as ROM, flash memory, etc.), or some combination of the two. This most basic configuration is illustrated in FIG. 7 by the dashed line 706.

The storage media devices may have additional features and functionality. For example, they may include additional storage (removable and non-removable) including, but not limited to, PCMCIA cards, magnetic and optical disks, and magnetic tape. Such additional storage is illustrated in FIG. 7 by removable storage 708 and non-removable storage 710. Computer-storage media include volatile and non-volatile, removable and non-removable media implemented in any method or technology for storage of information such as computer-readable instructions, data structures, program modules, or other data. Memory 704, removable storage 708, and non-removable storage 710 are all examples of computer-storage media. Computer-storage media include, but are not limited to, RAM, ROM, EEPROM, flash memory, other memory technology, CD-ROM, digital versatile disks, other optical storage, magnetic cassettes, magnetic tape, magnetic disk storage, other magnetic storage devices, and any other media that can be used to store the desired information and that can be accessed by the computing system.

Computing system 700 may also contain communication channels 712 that allow the host to communicate with other systems and devices. Communication channels 712 are examples of communications media. Communications media typically embody computer-readable instructions, data structures, program modules, or other data in a modulated data signal such as a carrier wave or other transport mechanism and include any information-delivery media. By way of example, and not limitation, communications media include wired media, such as wired networks and direct-wired connections, and wireless media such as acoustic, radio, infrared, and other wireless media. The term computer-readable media as used herein includes both storage media and communications media.

The computing system 700 may also have input components 714 such as a keyboard, mouse, pen, a voice-input component, a touch-input device, and so forth. Output components 716 include screen displays, speakers, printer, etc., and rendering modules (often called "adapters") for driving them. The computing system 700 has a power supply 718. All these components are well known in the art and need not be discussed at length here.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed and desired secured by United States Letters Patent is:

1. At a computer system including system memory and one or more processors, the computer system connected to one or more other computer systems via a computer network, the computer system also including a distributed application component of a distributed application, one or more other distributed application components of the distributed application being included at the one or more other computer systems, the distributed application component and the one or more other distributed application components configured to interoperate to implement the functionality of the distributed application, the computer system and each of the one or more other computer systems having computer system measurable aspects indicating a configuration for use in machine authentication, the distributed application component and each of the one or more other distributed application components having application measurable aspects indicating a configuration for use in application authentication, a method for providing information that can be used to securely verify measurable aspects of the distributed application component, the method comprising:

an act of the distributed application component sending communication to another computer system, the other computer system selected from among the one or more other computer systems, the communication requesting access to a resource under the control of another distributed application component, selected from among the one or more other distributed application components, at the other computer system;

an act of the computer system and the other distributed application component conducting application authentication so that the computer system can verify the identity of the other distributed application component, application authentication including the computer system receiving proof from the other distributed application component that the other distributed application component complies with one or more security policies of the computer system;

an act of the computer system accessing information that indicates how to prove an appropriate configuration, from among one or more appropriate configurations, to access the resource in accordance with the one or more security policies subsequent to and in response to successfully conducting application authentication, the accessed information indicating that one or more application measurable aspects of the distributed application component and one or more computer system measurable aspects of the computer system are to be verified to prove that the combination of the distributed application component and the computer system provide an appropriate configuration to interoperate with the other distributed application component to access the resource;

an act of the processor formulating an assertion that can used to verify the one or more application measurable aspects and the one or more computer system measurable aspects, the assertion representing identity values for the one or more application measureable aspects and representing environment values for the one or more computer system measurable aspects, the identity values expressly indicating the identity and the functionality of portions of computer-executable instructions included the distributed application component, the environment values identifying the execution environment at the computer system; and an act of sending the formulated assertion for verification.

2. The method as recited in claim 1, further comprising:

an act of receiving a request for proof that the distributed application component and the computer system are appropriately configured to interoperate with the other distributed application component to access the resource, the request being received prior to accessing information that indicates how to prove an appropriate configuration.

3. The method as recited in claim 1, wherein the act of accessing information that indicates how to prove an appropriate configuration comprises an act of accessing administrative policies associated with the resource.

4. The method as recited in claim 1, wherein act of accessing information that indicates how to prove an appropriate configuration comprises an act of accessing receiving a message from a verification module.

5. The method as recited in claim 1, wherein the act of accessing information that indicates how to prove an appropriate configuration comprises an act of accessing a request for values associated with one or more of an assembly, a hardware component, a platform, an environment variable, a call stack, and a data stream.

6. The method as recited in claim 5, wherein the request for values comprises a request for the values associated with the one or more application measurable aspects.

7. The method as recited in claim 6, wherein the request for the values of the one or more application measurable aspects comprises a request for the identity of one or more portions of executable instructions at the requester.

8. The method as recited in claim 1, wherein the act of accessing information that indicates how to prove an appropriate configuration comprises an act of accessing a request for byte values included in the computer-executable instructions of a specified version of the distributed application.

9. The method as recited in claim 1, wherein the act of accessing information that indicates how to prove an appropriate configuration comprises an act of a accessing a request for a digest of the one or more application measurable aspects.

10. The method as recited in claim 1, wherein the assertion is formulated proof that can be used to verify byte values included in the computer-executable instructions of a specified version of the distributed application.

11. The method as recited in claim 1, wherein the assertion is formulated proof that the distributed application component is to execute in a compartmentalized environment.

12. The method as recited in claim 1, wherein the assertion is formulated proof that the distributed application component has access to one or more of an assembly, a hardware component, a platform, an environment variable, a call stack, or a data stream.

13. The method as recited in claim 1, wherein the assertion is a digest representing the values of the one or more application measurable aspects.

14. The method as recited in claim 1, wherein the assertion is formulated proof that indicates at least one: of compliance with one or more required policies or that distributed application component is not a virus, or that the distributed application component is not an intruder.

15. The method as recited in claim 1, wherein the assertion is formulated proof that the distributed application component is configured in accordance with at least one pre-determined configuration.

16. The method as recited in claim 1, further comprising: an act of digitally signing the assertion.

17. The method as recited in claim 16, wherein the assertion is signed using a private key as proof that the assertion can be validated by a group public key.

18. The method as recited in claim 16, wherein the assertion is signed using a per-machine key that identifies the module.

19. The method as recited in claim 16, wherein the assertion is signed using a zero knowledge algorithm.

20. The method as recited in claim 16, wherein the assertion is signed using a hardware-based key.

21. The method as recited in claim 16, wherein the assertion is signed using a communication channel key.

22. The method as recited in claim 16, wherein the act of digitally signing the formulated proof comprises an act of digitally signing bytes taken from one or more identified code regions of computer-executable instructions within the distributed application.

23. The method as recited in claim 1, wherein the act of sending the formulated assertion to the verification module comprises sending the formulated assertion to a token service.

24. The method as recited in claim 1, further comprising: an act of receiving a token that represents proof that the combination of the distributed application component and the computer system are appropriately configuration to interoperate with the other distributed application component to access the resource.

25. The method as recited in claim 1, wherein the one or more appropriate configurations are have been pre-determined to be appropriate for accessing the resource.

26. A computer program product for use in a computer system, the computer system connected to one or more other computer systems via a computer network, the computer system also including a distributed application component of a distributed application, one or more other distributed application components of the distributed application being included at the one or more other computer systems, the distributed application component and the one or more other distributed application components configured to interoperate to implement the functionality of the distributed application, the computer system and each of the one or more other computer systems having computer system measurable aspects indicating a configuration for use in machine authentication, the distributed application component and each of the one or more other distributed application components having application measurable aspects indicating a configuration for use in application authentication, the computer program product for implementing a method for providing information that can be used to securely verify measurable aspects of the distributed application component, the computer program product comprising one or more computer-readable storage media having stored thereon computer-executable instructions that, when executed by a processer, cause the computer system to perform the method, including following:

send communication to another computer system, the other computer system selected from among the one or more other computer systems, the communication requesting access to a resource under the control of another distributed application component, selected from among the one or more other distributed application components, at the other computer system;

conduct application authentication with the other distributed application component so that the computer system can verify the identity of the other distributed application component, application authentication including the computer system receiving proof from the other distributed application component that the other distributed application component complies with one or more security policies of the computer system;

the computer system accessing information that indicates how to prove an appropriate configuration, from among one or more appropriate configurations, to access the resource in accordance with the one or more security policies subsequent to and in response to successfully conducting application authentication, the accessed information indicating that one or more application measurable aspects of the distributed application component and one or more computer system measurable aspects of the computer system are to be verified to prove that the combination of the distributed application component and the computer system provide an appropriate configuration to interoperate with the other distributed application component to access the resource;

formulate an assertion that can used to verify the one or more application measurable aspects and the one or more computer system measurable aspects, the assertion representing identity values for the one or more application measureable aspects and representing environment values for the one or more computer system measurable aspects, the identity values expressly indicating the identity and the functionality of portions of computer-executable instructions included the distributed application component, the environment values identifying the execution environment at the computer system; and send the formulated assertion for verification.

27. A computer system, the computer system comprising:

system memory;

one or more processors; and one or more computer-readable media having stored thereon computer-executable instructions representing an application authentication module, a machine authentication module, and a distributed application component of a distributed application, wherein the machine authentication module configured to:

conduct machine authentication with other computer systems, including establishing a Secure Sockets Layer (SSL) connection between the computer system and the other computer systems;

wherein the application authentication module is configured to:

conduct application authentication with other distributed application components of the distributed application at other computer systems after the other computer systems have been authenticated using machine authentication so that the computer system can verify the identity of the other distributed application components, application authentication including the computer system receiving proof from the other distributed application components that the other distributed application components comply with one or more security policies of the computer system; and wherein the distributed application component is configured to:

send communication to other computer systems that include a distributed application component for the distributed application, the communication requesting access to a resource under the control of another distributed application component at the other computer system;

access information that indicates how to prove an appropriate configuration, from among one or more appropriate configurations, to access the resource in accordance with the one or more security policies subsequent to and in response to successfully conducting application authentication, the accessed information indicating that one or more application measurable aspects of the distributed application component, including access to specified byte values from within specified locations in computer-executable instructions of the distributed application, and one or more computer system measurable aspects of the computer system, including specified values for specified execution environment variables, are to be verified to prove that the combination of the distributed application component and the computer system provide an appropriate execution environment for interoperating with the other distributed application component to access the resource;

formulate an assertion that can used to verify the one or more application measurable aspects and the one or more computer system measurable aspects, the assertion including the specified byte values from within the specified locations in computer-executable instructions and the specified values for the specified execution environment variables;

send the formulated assertion for verification;

receive a token representing that the combination of the distributed application component and the computer system do provide an appropriate execution environment for interoperating with the other distributed application component to access the resource; and submit the token to the other computer system so that the other computer system can verify that the combination of the distributed application component and the computer system do provide an appropriate execution environment for accessing the resource based on the context of the token.

* * * * *